United States Patent

Chesner

[11] Patent Number: 5,139,365
[45] Date of Patent: Aug. 18, 1992

[54] PROCESS FOR WASTE INJECTION INTO LANDFILLS FOR WASTE MANAGEMENT, LANDFILL RECLAMATION, ENHANCED BIODEGRADATION AND ENHANCED METHANE GAS GENERATION AND RECOVERY

[76] Inventor: Warren Chesner, 2171 Jericho Turnpike, Commack, N.Y. 11725

[21] Appl. No.: 577,449

[22] Filed: Sep. 4, 1990

[51] Int. Cl.⁵ .......................... B09B 1/00; E02D 3/12
[52] U.S. Cl. ...................................... 405/129; 210/751
[58] Field of Search ............... 405/128, 129, 266, 267; 210/747, 751

[56] References Cited

U.S. PATENT DOCUMENTS

| | | | |
|---|---|---|---|
| 3,262,274 | 7/1966 | Nelson | 405/128 |
| 3,665,716 | 5/1972 | Rogers et al. | 405/128 |
| 3,852,967 | 12/1974 | Stewart et al. | 405/128 |
| 4,540,316 | 9/1985 | Takahashi | 405/266 X |
| 4,911,584 | 3/1990 | Arenzana | 405/266 X |
| 4,931,192 | 6/1990 | Covington et al. | 210/751 |

FOREIGN PATENT DOCUMENTS

| | | | |
|---|---|---|---|
| 320393 | 6/1989 | European Pat. Off. | 405/128 |
| 140644 | 3/1980 | German Democratic Rep. | 405/128 |

Primary Examiner—Dennis L. Taylor
Assistant Examiner—John Ricci

[57] ABSTRACT

The present invention relates to a process for managing wastes and reclaiming landfill sites by using the inherent void space that exits within municipal solid waste landfills. The process comprises the injection of selected wastes and additives under pressure into the void space of existing landfills. Various materials can be added to the selected waste form such as hydraulic cement, lime, coal fly ash, waste fixing agents, buffering agents, water and plasticizers. These additives can assist in adding strength to the waste form, creating an insoluble waste material, adjusting the pH environment of the injected material, and enhancing its flowability. Depending on the waste type and additives, the process can be used to encapsulate wastes already existing within the landfill, reduce the permeability of the landfill, fix waste contaminants within the landfill to prevent them from leaching, increase the bearing capacity of the landfill, and reduce the ultimate settlement of the landfill. The process can also be used to increase the rate of consolidation and reduce the height of the landfill, or if appropriate organic sludges are added, the process can be used to enhance the rate of biodegradation of organic materials within the landfill, and to increase the rate of landfill gas production and methane gas recovery.

27 Claims, 3 Drawing Sheets

1A. PERMEATION    1B. COMPACTION

SUBSURFACE INJECTION PROCESSES

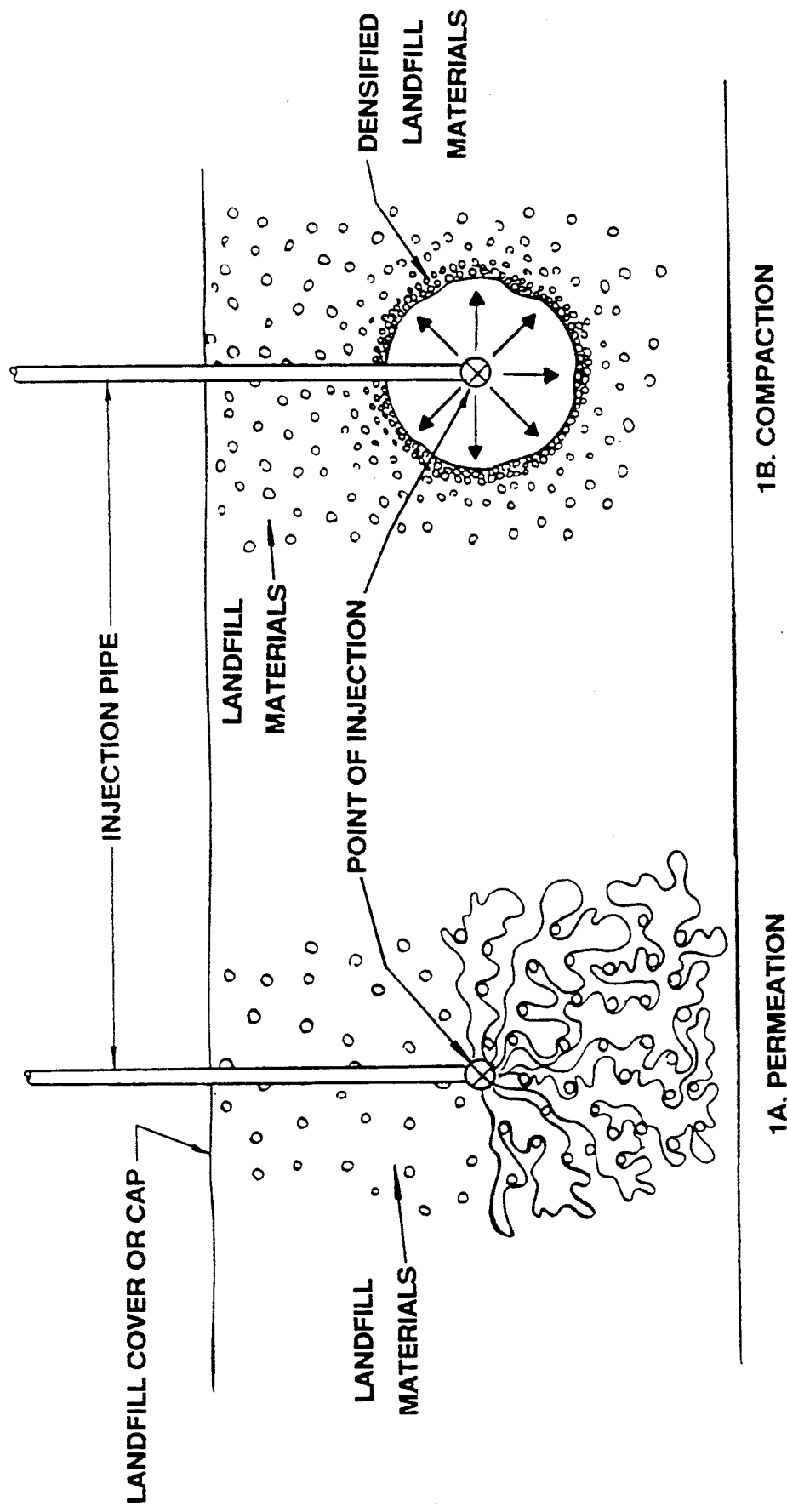

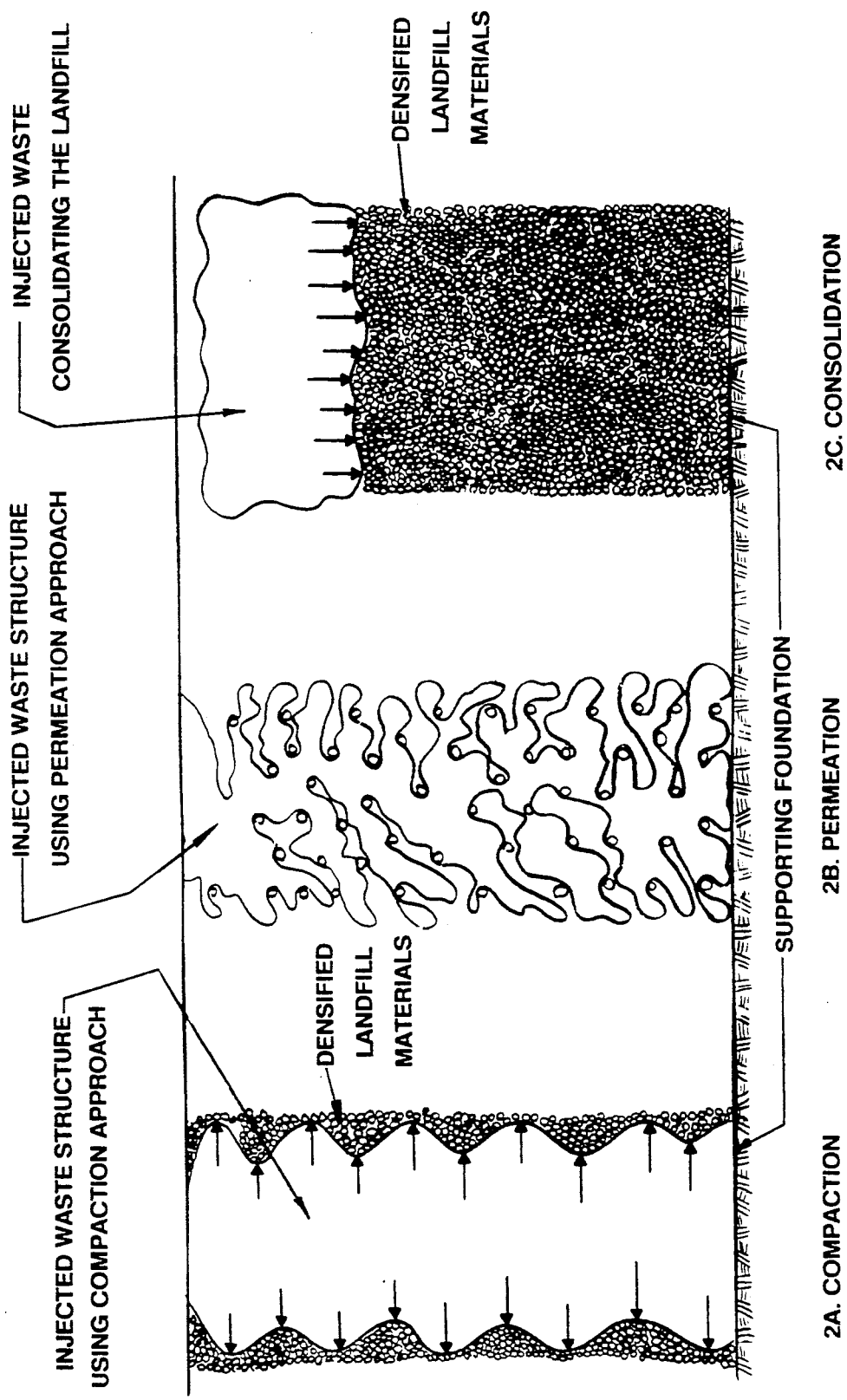
FIGURE 2: STRUCTURAL RECLAMATION OPTIONS

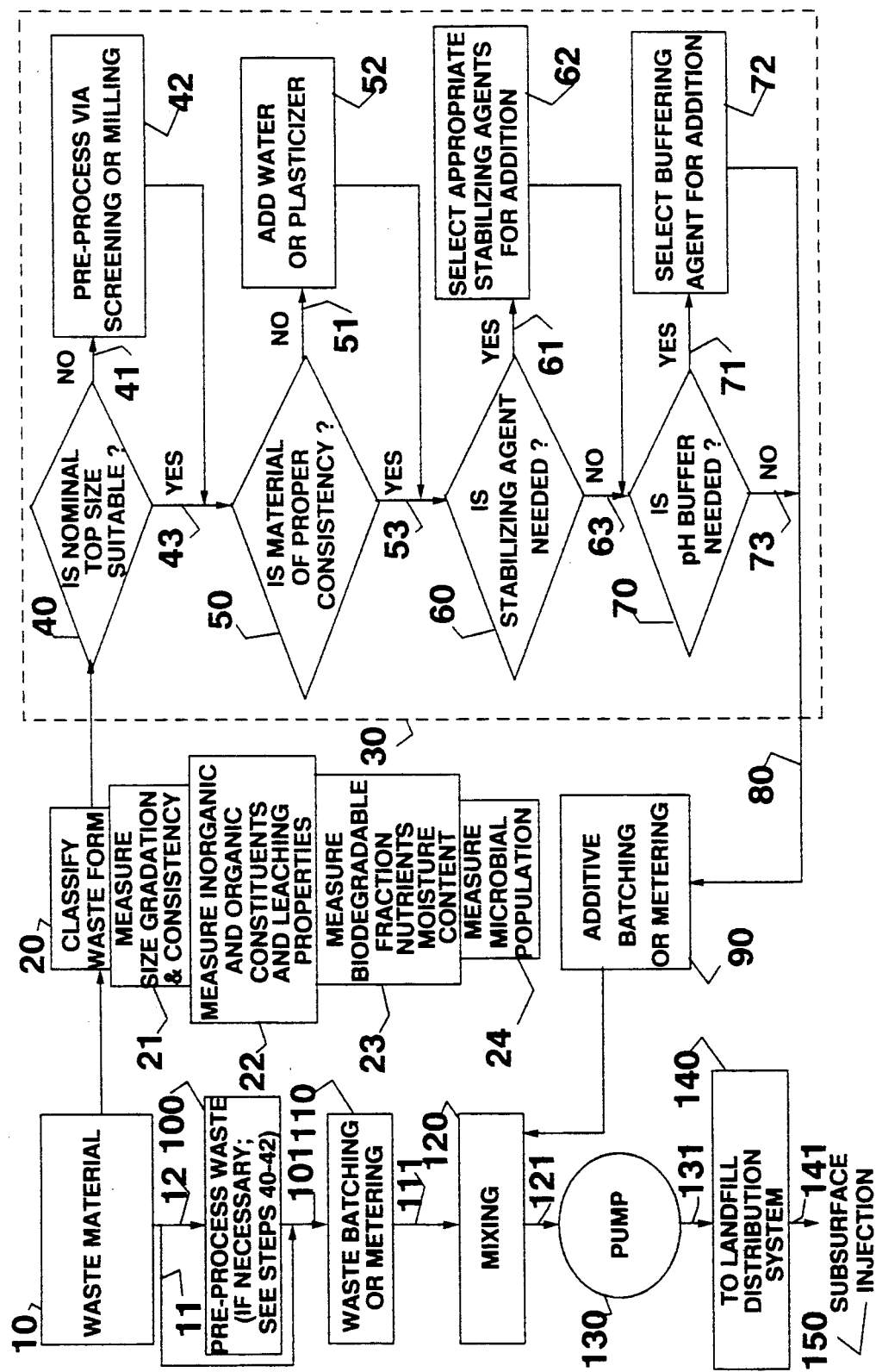
FIGURE 3: PROCESS FLOW SCHEMATIC

PROCESS FOR WASTE INJECTION INTO LANDFILLS FOR WASTE MANAGEMENT, LANDFILL RECLAMATION, ENHANCED BIODEGRADATION AND ENHANCED METHANE GAS GENERATION AND RECOVERY

TECHNICAL FIELD OF THE INVENTION

The present invention relates to a process for managing wastes and reclaiming landfill sites by using the inherent void space that exists within municipal solid waste landfills. The process comprises the injection of selected wastes and additives under pressure into the void space of existing landfills. Various materials can be added to the selected waste form such as hydraulic cement, lime, coal fly ash, waste fixing agents, buffering agents, water and plasticizers. These additives can assist in adding strength to the waste form, creating an insoluble waste material, adjusting the pH environment of the injected material, and enhancing its flowability. Depending on the waste type and additives, the process can be used to encapsulate wastes already existing within the landfill, reduce the permeability of the landfill, fix waste contaminants within the landfill to prevent them from leaching, increase the bearing capacity of the landfill, and reduce the ultimate settlement of the landfill. The process can also be used to increase the rate of consolidation and reduce the height of the landfill, or if appropriate organic sludges are added, the process can be used to enhance the rate of biodegradation of organic materials within the landfill, and to increase the rate of landfill gas production and methane gas recovery.

BACKGROUND OF THE INVENTION

The availability of adequate disposal capacity for waste products generated by society is an issue that has been a problem in the past, and will continue to be a major problem in the future. This problem is particularly troublesome in regions of high population density, such as major metropolitan areas, where landfill sites that were formerly used for disposing of municipal solid waste are at or near exhaustion, and new sites are unavailable.

Landfill sites, or portions of these sites that have exhausted their disposal capacity, are in many cases unesthetic landmarks, land areas that are unsuitable for development, and potential sources of both water and air pollution.

LANDFILL MATERIAL CHARACTERISTICS

Upon close examination of the materials which comprise the bulk of municipal solid waste that is landfilled it becomes apparent that these materials are, for the most part, highly compressible. In addition, when these materials are stockpiled or landfilled in a random manner they tend to produce a fill with high void spaces. The listing which follows provides an estimate of the types and relative quantities of materials which make up a typical municipal solid waste landfill. It also provides a qualitative assessment of the relative amount of void space and degree of compressibility that each major material component is expected to exhibit in a stockpile or landfill cell:

| Landfill Component | Typical % by Weight | Characteristics Void Space | Compressibility |
|---|---|---|---|
| Garbage/food waste | 10-20 | High | High |
| Paper/cloth | 10-40 | High | High |
| Lawn/garden | 10-20 | High | High |
| Plastics | 2-6 | High | High |
| Hollow metal | 5-15 | High | High |
| Massive metal | 1-2 | Low | Low |
| Rubber/tires | 5-10 | High | Medium |
| Lumber & demolition | 1-5 | High | Low |
| Rubble | 1-10 | High | Low |
| Glass | 5-15 | Medium | Medium |
| Cover/soil | 5-15 | Medium | Medium |

Given the predominance of highly compressible materials and materials that will produce high void spaces, it can be expected that a composite of materials, even when compacted using conventional landfill compaction techniques and equipment, will yield a fill with high void spaces and a high degree of compressibility. The field behavior or landfills is consistent with these observations. Landfills have relatively high rates of subsidence or settling and are permeable to both liquid and gas transport. It is the high rate of subsidence that occurs on landfill sites which is the primary reason why these sites are unsuitable for development.

Results of subsurface investigations of landfill sites using standard penetration tests (ASTM C1586) have been reported. Standard penetration tests are field tests which measure the energy required to penetrate subsurface formations. When penetrating municipal solid waste, the results of these tests are always less than 10 blows per foot (Sowers, G. F., "Foundation Problems in Sanitary Landfills," Journal of Sanitary Engineering, Proceedings of American Society of Civil Engineers, February 1968; Mabry, R. E., Building Development on a Municipal Refuse Landfill, American Society of Civil Engineers, 1977, pg. 793-809). Standard penetration test values of less than 10 blows per foot are typical of loose, soft and compressible formations with high void spaces.

WATER AND AIR POLLUTION FROM LANDFILLS

Municipal solid waste landfills are sources of contaminants that pollute both surface and groundwater resources. This is due to the presence of these contaminants in municipal, commercial or industrial wastes that are typically deposited in these landfills. Rainwater percolating through these landfills, that contact the waste materials, act as a transport medium for contaminants which ultimately find their way into either surface or ground waters.

In addition to the water pollution potential associated with these landfills, municipal solid waste landfills generate gas. Gas production results from biodegradation of the organic matter in the landfill. Landfill gas, which is chiefly comprised of methane and carbon dioxide, can produce hazardous conditions if the gas is permitted to migrate into confined areas and concentrations of methane are permitted to reach the Lower Explosive Limit (LEL) of methane in air, which is approximately 5 percent.

METHANE GAS RECOVERY IN LANDFILLS

The anaerobic environment within municipal solid waste landfills can result in the biodegradation of organic waste materials within the fill and the production of landfill gas, a significant fraction of which under the appropriate conditions will consist of methane or natural gas (approximately 45 to 55 percent). Methane gas recovery is presently practiced at numerous landfills around the country for both safety reasons (to control the migration of this potentially explosive gas) and for methane utilization (energy recovery). The efficiency of methane gas production (quantity and rate), and the rate of degradation of the organic fraction in municipal solid waste landfills is dependent on an environment in which the moisture content, pH, population of anaerobic organisms, available organic materials, and nutrients are in proper balance. In municipal solid waste landfill environments, such a balance is rarely achieved. As a result, methane production and biodegradation rates are extremely slow; and in much of the landfill biodegradation is virtually nonexistent. This is primarily due to the lack of adequate amounts moisture and nutrients.

Controlled landfilling of municipal solid waste has been proposed by previous investigators (Halvadakis, C. P., et. al., Landfill Methanogenosis: Literature Review and Critique, Department of Civil Engineering, Stanford University, Technical Report No. 271, August 1983) to increase the rate of production of methane gas. Controlled landfilling techniques are designed to add buffers, sewage sludge, sewage treatment plant effluents and moisture to municipal solid waste by premixing the refuse and additives, prior to landfilling, to produce an environment more suitable for methane generation. Other operations that have been proposed to mix refuse with some of the aforementioned products have includes the layered landfilling of refuse and sludge or the recirculation of landfill leachate or other wastewater treatment effluents onto the landfill.

The aforementioned activities are intended to produce an environment in which the moisture content of the solids within the landfill is as close to saturation as possible; to create an environment in which the carbon to nitrogen ratio is approximately 20 to 30; the nitrogen to phosphorus ratio is greater than 5; the pH of the environment is buffered in a range of 6.7 to 7.2, which is the optimum range for methanogenic bacteria; and to ensure that the population of methanogenic bacteria are sufficient to metabolize the complex organic materials within the fill to methane and carbon dioxide. Enhanced biodegradation rates for municipal solid waste have been well documented when controls over the aforementioned parameters are exercised (Buivid, M. G., et. al., Fuel Gas Enhancement by Controlled Landfilling of Municipal Solid Waste, Resource and Conservation, 6, 1981).

Although controlled landfilling or layered landfilling concepts could conceivably produce the aforementioned conditions, they are limited in practicality due to the difficulty of pre-handling and mixing the refuse with additives prior to landfilling. In addition these concepts do not offer options for enhancing biodegradation at existing landfill sites, where the refuse has already been deposited in the fill. Recirculation of landfill leachate or other effluents into the landfill could assist in increasing moisture content and perhaps nutrients in the landfill, however, such measures provide little control over the distribution of liquids percolating through the landfill, which are subject to short circuiting, clogging and/or puddling within the landfill.

GROUTING TECHNOLOGY

Cementitious or chemical grouts are flowable cement-like construction materials which are typically pumped to their final location where they cure and harden. Cement grouts are normally considered to be a mixture of portland cement and water or a mixture of portland cement, sand and water to which chemical admixtures may or may not be added. Chemical grouts include sodium silicates or other commercially available inorganic or organic mixtures which have flowable and hardening properties similar to cement grouts.

Grouts are commonly used in applications to fill joints in concrete structures; seal fissures under hydraulic structures; fill cavities behind tunnel linings; to seal a column of permeable soil from water penetration; to raise a depressed or settled section of a structure; or to increase the bearing capacity, shear strength or cohesive strength of soil or rock formations. Grouts can also be used for placing concrete materials underwater.

To those familiar with grouting technology, it will become apparent that there are similarities between the injection, permeation and compaction techniques proposed herein to manage waste materials in a landfill environment, and the use of grouts as construction materials. The similarities include the concept of pumping materials into the void spaces or pores of a new medium or environment; and batching, mixing, piping and pumping equipment required to achieve these ends.

WASTE FLOW IN SUBSURFACE LANDFILL ENVIRONMENTS

Fundamentally, the flow of liquids through small, uniform passages can be represented by a relationship in which the volumetric rate of liquid passing through small openings varies directly with the pressure, inversely with the viscosity; and is directly proportional to the fourth power of the average void size or passage opening (Poiseulle's law). In a landfill environment, however, where passages are non-uniform in size, shape and length, it is unlikely that such mechanistic relationships will apply. In addition, the introduction of a waste product under pressure can be expected to alter the size of the openings due to the compressible nature of the materials in the fill.

Given these unstable conditions, the exact nature or behavior of waste materials and additives that are injected into a fill are difficult to quantitatively predict. Nonetheless, given materials with known particle sizes, viscosity or flowability, and injection pressures, it is possible to those knowledgeable in the state-of-the-art of chemical or cement grouting techniques to determine by means of field testing, appropriate conditions to maximize the rate and quantity of material injected into a landfill; and by means of pressure monitoring, electrical resistively soundings and observation wells, monitor the path of the injected material.

Structural Stabilization Chemical Fixation and Biodegradation Activities using Waste Materials Combining selected waste materials with some additives have been proposed by others to produce structural materials:

U.S. Pat. No. 4,374,672; 2/1973, Funston et al., Method of and Composition for Producing a Stabilized Fill Material U.S. Pat. No. 4,306,910: 12/1981, Miyoshi et al., Method for Strengthening Water Saturated Soft Soils U.S. Pat. No. 4,354,876: 10/1982, Webster, Utilization of Dry Scrubber Waste Materials None of the aforementioned inventors, however, have considered the use of wastes and additives for injection into the void spaces of existing landfills for managing the waste as well as stabilizing the landfill.

The use of additives for fixing wastes has been documented and proposed by others:

U.S. Pat. No. 3,980,558: 9/1976, Thompson, Method of Disposing Sludges Containing Toxic Materials U.S. Pat. No. 4,116,705: 9/1978, Chappeli Detoxification U.S. Pat. No. 3,947,284: 9/1976, Kitzugi, et al., Method for Solidifying Sludge U.S. Pat. No. 4,338,134: 7/1982, Graf Zu Munster, Process for Binding Waste Liquid or Sludge U.S. Pat. No. 4,509,696: 4/1985, Donaldson, Method for Treating Liquid and Semi-Solid Organic Waste Materials U.S. Pat. No. 4,737,356: 4/1988, O'Hara, et al., Immobilization of Lead and Cadmium in solid Residues from the Combustion of Refuse Using Lime and Phosphate None of the aforementioned inventors, however, have considered the use of these additives and wastes for injection into the void spaces of existing landfills for managing the waste and stabilizing the landfill.

There have been studies undertaken which have investigated methods for enhancing methane gas recovery from municipal solid waste landfills. None of the investigators involved in these studies, however, have considered the possibility of the injection of sludges (e.g., sewage sludge) into the void spaces of landfills for managing the waste and enhancing the rate of biodegradation and methane gas recovery from the landfill.

The use of cement or chemical grouts for injection into subsurface formations to increase the strength and decrease the permeability of subsurface foundations is an existing technology used in construction applications. However, the use of waste materials as a substitute for the major components of the grout for injection into the void spaces of landfills for both managing the waste material and assisting in reclaiming the landfill has not been considered by others.

OBJECTS OF THE INVENTION

It is an object of the invention to provide a method of utilizing void spaces in existing landfills for waste management.

It is a further object to provide a method of locating penetrable porous spaces within landfills.

It is a further object to identify additives that can assist in filling void spaces in existing landfills with waste materials.

It is a further object of the invention to reclaim landfill sites by increasing the strength of material within landfills to support structures thereupon using waste materials.

It is a further object of the invention to increase consolidation of existing material within landfills using waste materials.

It is a further object to enhance biological degradation of landfill materials using waste materials.

It is a further object of the invention to increase the rate of methane gas production within landfill sites using waste materials.

It is a further object of the invention to prevent leaching of contaminants at landfills using waste materials.

It is a further object of the invention to decrease viscosity of and to enhance flowability of waste materials that are to be injected into landfills.

SUMMARY OF THE INVENTION

In keeping with these and other objects of the invention which will become apparent, a method is provided to identify waste materials suitable for injection into void spaces within landfills, to make mixtures of waste materials and additives suitable for injection into void spaces within landfills, to locate highly porous zones within the landfill, to determine optimal rates of flowability of waste materials for injection into the void spaces, and to inject the material into the void spaces within the landfill.

The processes described herein can be used to simultaneously make use of the heretofore unused volumetric capacity within existing landfill sites for waste disposal, and to provide a means, depending on the waste-type and additives to be injected, to physically, chemically and biologically stablize the landfill site in order to reduce or eliminate some of the negative structural, hazardous, polluting and gas generating problems associated with these sites. The processes can also be used to increase the rate of landfill gas generation, which could improve the economic benefits of landfill gas recovery.

It is expected that the porosity of landfill sites may range from a low of approximately 25 percent to greater than 60 percent. A 60 percent porosity means that only 30 to 40 percent of the volume occupied by the land mass is actually being used. The effective porosity, which can be defined as the unused volume that can effectively be penetrated with injected waste products and additives, will depend upon the history of the landfill with respect to its age, dimensions, types of waste that were deposited, and landfill operating practices. It will also depend on the material properties of the waste and additives that will be injected as well as the applied injection pressure. It is apparent however, that even at low estimates of effective porosity the potential volumetric capacity that exists in landfill sites is extremely large and offers an opporune location for additional disposal capacity.

DESCRIPTION OF THE DRAWINGS

FIG. 1 is a vertical profile of subsurface injection processes according to the invention.

FIG. 2 is a conceptual schematic view of the structural stabilization and consolidation processes according to the invention.

FIG. 3 is a flow chart delineating the waste material evaluation and injected steps involved according to the invention.

DESCRIPTION OF THE PREFERRED EMBODIMENT

The present invention includes a process for the subsurface injection of materials into landfills to fill the inherent void space created by the accumulation of highly porous waste materials within the confines of the landfill.

As shown in FIG. 1A, waste materials and additives can be injected into the pore space of landfill materials, resulting in the permeation of the injected waste materials and additives throughout the landfill voids. As shown in FIG. 1B, higher density waste materials and additives can be forced under pressure to displace existing materials within landfills.

As shown in FIG. 2, structural reclamation options are presented. These structural reclamation options include methods for injecting a solid column-like mass of waste with suitable strength to support overburden pressures, as shown in FIG. 2A; injecting and permeating wastes with suitable strength throughout the vertical profile of the landfill to support overburden pressures, as shown in FIG. 2B; or injecting wastes of relatively high density on top of the waste fill to assist in consolidating the waste material and the landfill, as shown in FIG. 2C.

As shown in FIG. 3, waste material is first accumulated, and then preprocessed, if necessary, to reduce the material to the appropriate size gradation to optimize the flow characteristics of the waste material. The material, if necessary, may then be batched and mixed with additives such as water, plasticizers, stabilizing agents and pH buffers to further improve its flow characteristics and/or physical and chemical properties for selected landfill stabilization and reclamation objectives. The waste material is then pumped under pressure and injected into void spaces within existing landfills, thereby filling the void spaces by subsurface injection.

SUBSURFACE FLOW MECHANISMS

There are two primary mechanisms which can be used to conceptually describe the manner in which waste materials and additives may be introduced into the landfill environment. The first mechanism is the injection of the waste material and additives into the fill under pressure and the permeation or infiltration of the materials through the void spaces within the landfill. The second mechanism is the injection of the waste material and additives into the fill under pressure and the compaction or displacement of the solid waste within the landfill. This compaction or displacement is due to the pressurized injection of waste materials into void spaces which expand due to the localized pressure and the compressible nature of the surrounding landfilled materials. The actual method of application will depend on the specific waste being injected, the injection pressures and selected additives. In actual practice, the injection mechanism will typically be a combination of both permeation and compaction operations. Permeation and compaction mechanisms are depicted in FIG. 1. A third potential injection mechanism is that of replacement. In this method materials are removed from the landfill and replaced with injected wastes, or reinjected into wastes which are returned to the site.

It should be apparent to those familiar with grouting technology that the degree to which either permeation or compaction mechanisms will predominate is dependent on the properties of the injected materials. One key property is the consistency of the material, as measured by the flow cone test (ASTM C939), flow table test (ASTM C230), and/or slump tests (ASTM C143). Other properties of importance in designing a mix include workability, bleeding, water retention, strength, setting time, volume changes, temperature effects, durability and permeability.

By preparing waste-mix designs with defined properties, the degree to which permeation and compaction processes dominate can be controlled. This makes it possible to control the degree to which the material will migrate in the subsurface environment of the landfill. In addition, in certain circumstances it may be desirable to use the compaction process to create a subsurface boundary, border or control volume, and permeation and/or compaction processes to fill in the selected control volume.

During injection of the waste-mix into the landfill the direction of waste flow will be from points of higher pressure to points of lower pressure. It is possible that the injected waste mix may be inclined, due to pressure differentials in the landfill, to migrate toward the surface of the fill, instead of laterally out or in a downward vertical direction. This can be prevented during operation by sealing layers above the intended depth of injection with waste-mix matrices that will develop impermeable surfaces with sufficient strength to prevent the migration of the injected materials into the upper layers of the fill. After the development of sufficient resistance in the upper layers, holes can be drilled through the newly constructed layers of resistance to permit the injection of waste materials below these flow-resistent layers.

WASTE TYPES

As previously noted, the invention makes use of the available volumetric capacity at landfill sites by injecting selected and preprocessed waste materials, containing in some-cases additives, under pressure into the landfill. Not all wastes are equally suitable for the proposed application. Wastes that are most suitable are fine-grained wastes or wastes that have been preprocessed to a fine grain size and liquified; or semi-liquid sludges. Examples of fine-grained waste are ash products from combustion facilities. This can include ash products from municipal solid waste, coal, wood, and sludge combustors. Dredged spoils, which consist of fine-grained sands may also be suitable. Examples of semi-liquid sludges include municipal wastewater treatment plant sludges and flue gas desulfurization sludges. These fine-grained wastes and/or sludges are in a form, or can be processed into a form that is a flowable and can be injected into the void spaces within a landfill.

The types of waste products and additives that are preferable are those that can accelerate processes for reclaiming the landfill site by enhancing the physical, chemical and biological stabilization of the landfill.

LANDFILL STABILIZATION PROCESSES

In addition to the exploitation of the volumetric capacity of existing landfill sites for waste disposal, the proposed invention offers the means to beneficially modify existing landfill sites to enable their future reclamation. The specific landfill modification process achievable is dependent on the type of waste and additives to be injected. Landfill modification processes can be subdivided into three categories: 1) enhanced physical stabilization, 2) enhanced chemical stabilization, and 3) enhanced biological stabilization.

ENHANCED PHYSICAL STABILIZATION

The injection of fine-grained wastes that consist primarily of inorganic materials, which are physically similar to aggregate materials such as sand, gravel and mineral filler, can be used to physically stabilize existing landfill sites. Injection of fine-grained wastes into the void spaces of landfills can be used as structural columns or foundations to transmit the weight of overlying structures to underlying formations capable of serving as the basic supporting medium. Mineral waste types that have specific applicability in physical stabilization processes are municipal solid waste combustion ash, sewage sludge ash, dredged spoils, coal fly ash and flue gas desulfurization sludges.

The structural and environmentally-related properties of these wastes can be enhanced by mixing some of these waste products with hydraulic cement, lime, mixtures of coal ash and lime, and water prior to injection to produce a concrete-like structure to be used as the structural supporting material. The waste product can be introduced into localized areas in a manner that will produce vertical columns, similar to cast-in-place piles to support footings; or can be injected to permeate as much of the void space of selected sections of the fill as possible to increase the bearing capacity of the fill itself, and decrease settlement due to overburden compression.

An alternative to the continuous injection of waste down to a firm, stable support, below the waste fill, is the injection of waste into the top of the fill to promote consolidation and more rapid subsidence of the fill. Injection of waste materials into the upper layers of the fill could be introduced in such a manner as to produce overburden pressures on the fill, thereby increasing the consolidation or settling rates of the fill. The use of stiffer mixes that would limit wide-spread permeation of the waste product would be preferable in consolidation applications to regulate the placement of overburden loads at specific locations within the fill. The end result of this activity would be the lowering of height of the landfill at a more rapid rate than that which would occur if the landfill were left to consolidate under natural conditions.

FIG. 2 provides a conceptual schematic of structural stabilization and consolidation processes as they relate to the landfill injection processes previously discussed.

ENHANCED CHEMICAL STABILIZATION

The injection of waste materials along with appropriate additives could assist in chemically stabilizing the landfill site by buffering the landfill environment, fixing wastes contained within the landfill, and reducing the permeability of the landfill to prevent the release of contaminants from the landfill site. Buffering of the landfill to control the pH of the site could be accomplished by means of additives such as cements, lime, phosphates, carbonates or weak acids and their salts that are incorporated into the waste mix. This could be particularly effective in reducing the leachability of trace metals which are more prone to leaching in an acidic environment, or for those trace metals that are amphoteric and tend to leach in alkaline as well as acidic environments. Since the tendency in a landfill is towards an acidic environment due to the introduction of acid rain and organic acid production, appropriate alkaline additives could assist in reducing potential leachability.

Additives such as those outlined above could also assist in fixing contaminants by reacting with contaminants to produce insoluble precipitates or encapsulating the materials within impermeable cement matrices. This encapsulation could reduce the availability of materials for contact with percolating rainwater or groundwater, hence reducing or eliminating the leachability of the waste products in the fill.

ENHANCED BIOLOGICAL STABILIZATION

The introduction of sewage sludge and appropriate additives into a landfill site by means of controlled injection provides a means to introduce moisture, nutrients (i.e., carbon, nitrogen and phosphorus), buffering agents (e.g., phosphoric acid, calcium carbonate, lime), and additional microorganisms in a calculated manner to enhance gas production and potential gas recovery. Estimates of the quantity of waste required to saturate a given mass of municipal solid waste, along with the nitrogen and phosphorous content of the organic sludge to be injected, could be used to estimate the quantity of sludge which should be injected per unit volume of landfill, as well as additional additives which may be necessary to control the pH of the control volume for optimum methanogenesis. The result would be a more rapid degradation of the organic content in the landfill and the extraction of landfill gas at several times the rate of current landfill gas recovery systems.

As an alternative to activities that promote more rapid biodegradation of organic wastes, the encapsulation of organic wastes within the landfill by injecting mineral wastes with additives that will cure to produce an impermeable matrix will act to prevent necessary moisture from reaching the organic waste materials. This would result in a slowdown or cessation of biological degradation and the production of landfill gas. In effect, where it is desirable to reduce the rate of gas production, the use of the aformenntioned process can accomplish this task.

PROPERTIES OF WASTE MATERIALS AND POTENTIAL ADDITIVES

The desired properties of waste material-additive mixes will be dependent on the waste-type and the intended landfill stabilization objectives, previously discussed. The physical nature of the waste-types, which include morphology, grain size distribution, durability, unit weight, moisture content, absorption, and the chemistry of the waste type will determine the need for additives to enhance the properties of the waste to achieve the desired landfill modification objectives.

Additives which can be included as potential reagents in the process include:

1. Water—as a carrier material to reduce the viscosity of the waste, increase the flowability, to react with other additives to produce cementitious reactions, and where biodegradation objectives are desired to provide an environment suitable for biological activity.
2. Cements or pozzolans—as additives to produce cementitious reactions to add strength to the injected materials, to assist in encapsulating wastes within the landfill, and to reduce the permeability of the fill. Examples of cements include hydraulic cement or Class C self-cementing coal fly ash (ASTM C618). Examples of a pozzolan is Class F coal fly ash (ASTM C318), which will react with lime to produce a cementitious reaction.
3. Buffers or fixing agents—to adjust the injected waste and the landfill environment to desirable pH conditions and/or simultaneously react with wastes within the landfill to prevent the leaching of contaminants from the waste materials. Examples of buffers and fixing agents are phosphate, carbonates, lime, sulfides, or cements that can be used to adjust the pH and/or react with trace metals such as lead (Pb), cadmium (Cd), arsenic (As), mercury (Hg), etc. to product insoluble precipitates. Buffering can be used for chemical stabilization or to enhance the rate of biological stabilization of the landfill.

4. Plasticizers—to decrease the viscosity of the waste material and additives. Plasticizer products which are commercially available (e.g., sulfonated napthalene condensates) can be used to increase the flowability with reduced water content if desirable. Utilization of these products could assist in producing higher strength in-place waste products when cement or pozzolans are added to a mix.

5. Solid particle flow enhancers—to assist in increasing the flowability of the material as a result of the shape and size of the material. An example of such a material is coal fly ash which is composed primarily of spherical particles that will decrease the viscosity of a mix and increase flowability.

To those with expertise in the preparation and use of chemical and cement grouts as well as the mixing of natural aggregates and cements or pozzolanic materials and lime, it should be apparent that the use of a waste material as part of a mix design is not necessary to implement some of the landfill modifications presented in the aforementioned sections; and that the use of selected natural or manufactured products could achieve similar results. Nonetheless, the use of waste materials provides a major advantage to the process in that a combination of waste management and landfill reclamation activities are combined into one operation.

MODE OF OPERATION

The method of filling void spaces within landfills can be defined in a series of steps. These steps include the a. Determination of the suitability of the landfill for injection via subsurface surveys and a review of landfill operating data (e.g., types of waste deposited in the fill, age of the fill, compaction techniques, liner and capping designs);

b. Identification of the type of waste material and the quantity of waste material planned for injection;

c. Delineation of the landfill reclamation or stabilization objectives, if any;

d. Design of the appropriate mixture of waste and additives, if needed, to achieve the flow characteristics, and physical and/or chemical properties required for injection and landfill stabilization;

e. Delineation of the control volume into which the material will be injected;

f. Design of an injection grid which specifies the location and depths at which the waste material will be injected and the desired injection rates;

g. Design of a monitoring system to include a series of observation wells and/or resistivity sounding monitors, and pumping pressure monitors to track the extent of the injection and the injection pressures;

h. Initiation of injection pumping of the waste-mix, and the monitoring of injection pressures and the extent of waste migration in the landfill; and i. Design modifications to the pumping strategy with respect to grid layout or required pressures, if needed, to achieve the design objectives.

More specifically, with respect to FIG. 3, the process of identifying a waste material, as per Step 10, and designing a waste material for injection into a landfill, initially involves the physical, chemical and biological characterization of the waste material as per Step 20.

Physical characterization (Step 21) includes measurement of particle size or gradation and/or consistency or flowability of the waste form. Chemical characterization (Step 22) involves the analysis of the chemical constituents in the waste form, and the leaching behavior of those constituents; biological characterization (Step 23) involves an analysis of the biodegradable fraction of the waste form, the nutrient content and (Step 24) the microbial population in the waste form. Classification of the waste form (Step 20) may require testing of the waste material or may be based on prior knowledge of the characteristics of the waste.

Once characterized a series of decisions must be made to determine whether additional materials will be added to the waste form. The decision matrix is presented in Step 30 and includes a decision tree represented by Steps 40, 50, 60 and 70.

As shown in Step 40, an evaluation of the suitability of size for injection is required. If the waste form's top size is considered limiting (Step 41), then screening or size reduction (Step 42) may be required. It will be desirable in most cases to minimize the maximum particle size of the waste form to avoid clogging of potential pores within the landfill refuse. However, it may be desirable, depending on the specific landfill reclamation objectives, to have a well-graded waste material with coarse particle sizes to provide a material better suited for structural stabilization. Although particle sizes less than ¼-inch in diameter may be most suitable, there is no reason to expect that wastes with particle sizes up to 2-inches in diameter could not be injected into the landfill. When the appropriate size is achieved (Step 43), then the user proceeds to evaluate consistency (Step 50).

As shown in Step 50, an assessment is required to establish whether the consistency and/or flowability of the waste form is suitable for injection, or whether water or plasticizers may be needed to enhance the flowability of the waste material if the measurement of the consistency yields an unsuitable result (Step 51). Then water or plasticizers may be added (Step 52). If the measurement of the consistency yields a suitable result (Step 53), then the user proceeds to evaluate the need for stabilizing agents (Step 60).

As shown in Step 60, a decision is required regarding the need for stabilizing agents. This decision will, in most cases, be based on the reclamation and pollution control objectives associated with the injection process. If the material does require the addition of stabilizing agents (Step 61), mix designs (i.e., percentage of stabilizing agent(s) plus waste) will need to be formulated to meet the desired objectives (Step 62).

If the material does not require the addition of stabilizing agents (Step 63), then as shown in Step 70, an evaluation of the need for buffering agent(s) is required. This evaluation will be based on the need to control the pH environment of the injected material and surrounding landfill environment.

If the buffering capacity of the waste is inappropriate (Step 71), then buffers may be added (Step 72). If no buffer is needed (Step 73), then as shown in FIG. 3, after Step 30 is completed, batching or metering of any additives will be required (Step 90) prior to mixing of the additives with the waste form (Step 120).

Preprocessing of the waste form may be required, depending on Steps 40 to 42 (Step 100). Batching and metering of the waste form will also be required (Step 110) prior to mixing with any additives (Step 120). The mixture will then be pumped (Step 130), into the landfill distribution system (Step 140) which will consist of a series of installed pipes extending below the landfill surface.

Standard penetration tests and borings along with a survey of materials that were reportedly deposited in the fill can be used to assess the suitability of the fill for injection. In a landfill environment, values of less than 10 blows per foot indicate the presence of mixed municipal solid waste with relatively high void space in which effective porosities in excess of 25 percent should be readily achievable for most conditions. Higher standard penetration test values are indicative of areas with lower void spaces and compressibility. These areas are less suitable for the application and will ordinarily result in lower effective porosities.

The presence of ponded water in the fills, which can be detected by borings or observation wells, is of importance since injection into a supersaturated fill will require accounting for the displacement of this liquid during the injection of the waste mix. A review of the landfill design and operation, particularly with respect to location of the leachate or gas collection system, is of importance to avoid damaging or clogging of these systems during injection.

Although particular embodiments are described herein, it is understood that various modifications may be made without departing from the scope of the invention, as noted in the appended claims.

What is claimed is:

1. A method for utilizing the inherent volumetric capacity that exists within municipal solid waste landfill sites for disposing of selected waste materials comprising the steps of:
   a) measuring the expected porosity of subsurface landfill waste materials and assigning a minimal value to said materials;
   b) selecting external waste materials with predetermined physical, chemical and biological characteristics;
   c) dividing the volume of said landfill into a three dimensional grid of specified locations and depths;
   d) installing a monitoring system of selectively placed observation, pressure and flow monitors into said lansdfill grid;
   e) assigning an available volumetric capacity to the control volume defined by the selected grid and expected effective porosity of the site;
   f) injecting said external waste materials having minimal flowability characteristics under pressure into said locations and depths of said landfill grid with landfill waste materials having minimum porosity values so as to create a new mixture of said external waste materials and said landfill materials.

2. The invention as in claim 1, further comprising the steps of:
   a) measuring the rate of methane gas production within each of said grid locations;
   b) assigning a minimal rate and quantity of methane gas required at said locations;
   c) injecting predetermined chemical and biological additives to a mixture at said predetermined grid locations to increase the rate and quantity of methane gas production to said minimal rate and quantity of methane gas production.

3. The invention as in claim 2, further comprising the step of:
   a) adding a buffering agent to provide an environment with a pH that is most suited for methanogenic organism activity.

4. The invention as in claim 3, further comprising the step of:
   a) adding buffers as part of the waste-mass mix, including weak acids and salts of weak acids, adjusting the environment of the landfill, fixing the waste contained in the injected mass, fixing wastes previously contained in the landfill, and producing an environment that is suitable for methanogenic organism activity.

5. The invention as in claim 2, further comprising the step of:
   a) adjusting the moisture content, nutrient content and microorganics of the said landfill by the injection of selected organic sludges.

6. The invention as in claim 1, further comprising the step of:
   a) adding a buffering agent to reduce the leachability of the external waste and landfill waste materials.

7. The invention as in claim 6, further comprising the step of:
   a) adding buffers as part of the waste-mass mix, including weak acids and salts of weak acids, adjusting the environment of the landfill, fixing the wastes contained in the injected mass, fixing wastes previously contained in the landfill, and producing insoluble precipitates.

8. The invention as in claim 1, further comprising the steps of:
   a) adding waste organic sludges as a microbial innoculum and a source of nutrients and moisture;
   b) adding buffering additives to control pH of the landfill waste materials;
   c) adding supplemental nutrients to accelerate the decay of organic matter within landfill waste material.

9. The invention as in claim 1, further comprising the step of:
   a) encapsulating the external and landfill waste material in an impervious barrier.

10. The invention as in claim 1, further comprising the step of:
    a) injecting under pressure fine-grained wastes and sludges into the void spaces of municipal solid waste landfills for disposing of these selected wastes.

11. The invention as in claim 10, further comprising the step of:
    a) adding plasticizers and decreasing the viscosity of the external waste mass to increase flowability.

12. The invention as in claim 1, further comprising the step of:
    a) compacting and permeating the landfilled material to effect the placement and distribution of selected waste types into the landfill environment.
    b) compacting and permeating the landfilled material to structurally stabilize the landfill, to increase the bearing capacity of the landfill, or to assist in consolidating the landfill.

13. The invention as in claim 1, futher comprising the step of:
    a) sealing of the landfill to permit the injection of wastes under high pressure into the landfill environment.

14. A method for utilizing the inherent volumetric capacity that exists within municipal solid waste landfill sites for disposing of selected waste materials comprising the steps of:
 a) measuring the expected porosity of subsurface landfill waste materials and assigning a minimal value to said materials;
 b) selecting external waste materials with predetermined physical, chemical and biological characteristics;
 c) mixing said waste materials with additives to decrease viscosity of said materials to a flowability that will maximize its permeation through and/or compaction of existing landfill waste materials;
 d) selecting a quantity of said mixture of said external waste materials and said additives for injection of said mixture into said existing landfill waste materials;
 e) dividing the volume of said landfill into a three dimensional grid of specified locations and depths;
 f) installing a monitoring system of selectively placed observation, pressure and flow monitors into said landfill grid;
 g) assigning an available volumetric capacity to the control volume defined by the selected grid and expected effective porosity of the site;
 h) injecting said external waste materials having minimal flowability characteristics under pressure into said locations and depths of said landfill grid with landfill waste materials having minimum porosity values so as to create a new mixture of said external waste materials and said landfill materials.

15. The invention as in claim 14, further comprising the steps of:
 a) measuring the rate of methane gas production within each of said grid locations;
 b) assigning a minimal rate and quantity of methane gas required at said locations;
 c) injecting predetermined chemical and biological additives to a mixture at said predetermined grid locations to increase the rate and quantity of methane gas production to said minimal rate and quantity of methane gas production.

16. The invention as in claim 15, further comprising the step of:
 a) adding a buffering agent to provide an environment with a pH that is most suited for methanogenic organism activity.

17. The invention as in claim 15 further comprising the step of:
 a) adjusting the moisture content, nutrient content and microorganics of the said landfill by the injection of selected organic sludges.

18. The invention as in claim 14, further comprising the step of:
 a) adding a buffering agent to reduce the leachability of the external waste and landfill waste materials.

19. The invention as in claim 18, further comprising the step of:
 a) adding buffers as part of the waste-mass mix, including weak acids and salts of weak acids, adjusting the environment of the landfill, fixing the wastes contained in the injected mass, fixing wastes previously contained in the landfill, and producing insoluble precipitates.

20. The invention as in claim 14, further comprising the steps of:
 a) adding waste organic sludges as a microbial innoculum and a source of nutrients and moisture;
 b) adding buffering additives to control pH of the landfill waste materials;
 c) adding supplemental nutrients to accelerate the decay of organic matter within landfill waste material.

21. The invention as in claim 14, further comprising the step of:
 a) encapsulating the external and landfill waste material in an impervious barrier.

22. The invention as in claim 14, comprising the step of:
 a) injecting under pressure fine-grained wastes and sludges into the void spaces of municipal solid waste landfills for disposing of these selected wastes.

23. The invention as in claim 22, further comprising the step of:
 a) adding plasticizers and decreasing the viscocity of the external waste mass to increase flowability.

24. The invention as in claim 14, further comprising the step of:
 a) compacting and permeating the landfilled material to effect the placement and distribution of selected waste types into the landfill environment.
 b) compacting and permeating the landfilled material to structurally stabilize the landfill, to increase the bearing capacity of the landfill, or to assist in consolidating the landfill.

25. The invention as in claim 14, further comprising the step of:
 a) sealing of the landfill to permit the injection of wastes under high pressure into the landfill environment.

26. The invention as in claim 14, further comprising the step of:
 a) adding additives such as hydraulic cement, lime, coal fly ash and other pozzolans to increase the strength and encapsulate the injected waste areas and react with potential contaminants to fix and prevent the leaching of the contaminants.

27. The invention as in claim 14, further comprising the step of:
 a) adding additional particulate matter with spherical particles such as coal fly ash, enhancing the flowability and reducing the viscosity of the waste mass mix prior to injection of solid waste mass mix into said landfill.

* * * * *